US007076366B2

(12) United States Patent
Simon et al.

(10) Patent No.: US 7,076,366 B2
(45) Date of Patent: Jul. 11, 2006

(54) OBJECT COLLISION AVOIDANCE SYSTEM FOR A VEHICLE

(76) Inventors: Steven Simon, 19262 Rockport Dr., Roseville, MI (US) 48066; Eric A Simon, 1149 Bedford Rd., Grosse Point, MI (US) 48230

( * ) Notice: Subject to any disclaimer, the term of this patent is extended or adjusted under 35 U.S.C. 154(b) by 69 days.

(21) Appl. No.: 10/656,675

(22) Filed: Sep. 5, 2003

(65) Prior Publication Data

US 2004/0049344 A1 Mar. 11, 2004

Related U.S. Application Data

(60) Provisional application No. 60/408,654, filed on Sep. 6, 2002.

(51) Int. Cl.
*G01S 13/93* (2006.01)
*G08B 21/00* (2006.01)

(52) U.S. Cl. ......................... 701/301; 701/45; 340/435

(58) Field of Classification Search ................ 701/300, 701/301, 45; 342/70, 71, 72; 340/436, 435, 340/903; 180/271, 274, 275; 367/112, 909, 367/96

See application file for complete search history.

(56) References Cited

U.S. PATENT DOCUMENTS

| | | | | |
|---|---|---|---|---|
| 5,574,426 | A * | 11/1996 | Shisgal et al. | 340/435 |
| 6,390,498 | B1 * | 5/2002 | Francis et al. | 280/735 |
| 6,606,027 | B1 * | 8/2003 | Reeves et al. | 340/436 |
| 6,784,828 | B1 * | 8/2004 | Delcheccolo et al. | 342/70 |
| 2003/0141965 | A1 * | 7/2003 | Gunderson et al. | 340/431 |
| 2003/0212480 | A1 * | 11/2003 | Lutter et al. | 701/33 |

* cited by examiner

*Primary Examiner*—Dalena Tran
(74) *Attorney, Agent, or Firm*—Harness, Dickey & Pierce, P.L.C.

(57) ABSTRACT

A collision avoidance system for a vehicle includes a warning device and a plurality of sensors that are arranged around the vehicle and that have sensing zones. Each of the sensors senses objects that are located in the sensing zone and generates sensor signals that are related to a distance between respective ones of the sensors and the objects in the sensing zones. Memory stores a plurality of profiles, which defines alarm limits for each of the sensors. A profile selection device allows selection one of the plurality of profiles from the memory. A vehicle collision avoidance controller communicates with the plurality of sensors and triggers the warning device when the sensor signal that is associated with one of the plurality of sensors exceeds a respective one of the limits in the selected profile.

20 Claims, 5 Drawing Sheets

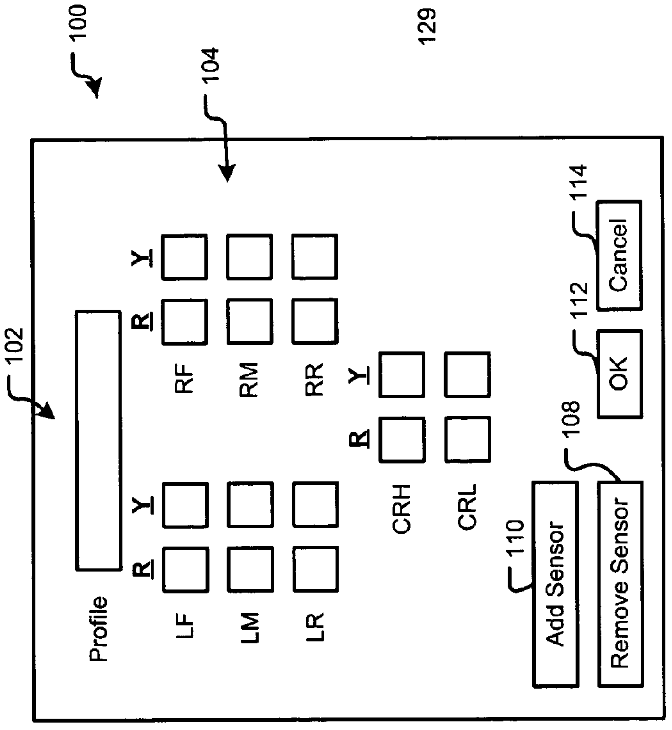
FIG. 4
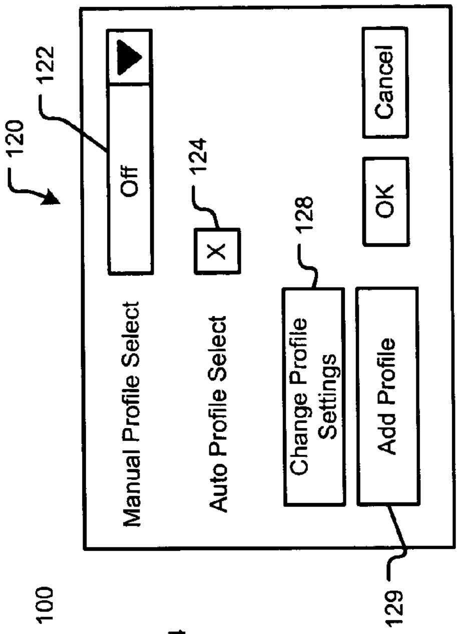
FIG. 5
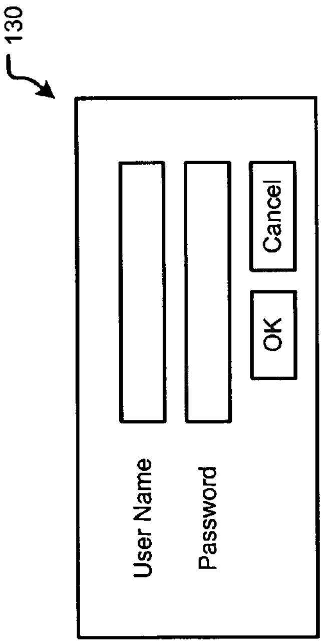
FIG. 6
140
| UserName | Profile |
|---|---|
| JBW | City |
| JBW | Rural |
| RRW | Warehouse 1 |
| JBW | City |
| RRW | Warehouse 2 |
FIG. 7

OBJECT COLLISION AVOIDANCE SYSTEM FOR A VEHICLE

CROSS-REFERENCE TO RELATED APPLICATIONS

This application claims the benefit of U.S. Provisional Application No. 60/408,654, filed on Sep. 6, 2002, which is incorporated herein by reference in its entirety.

FIELD OF THE INVENTION

The present invention relates to vehicles, and more particularly to object collision avoidance systems for vehicles.

BACKGROUND OF THE INVENTION

Collision avoidance systems attempt to prevent collisions between a vehicle and other objects, which can be stationary and/or moving. The collision avoidance systems are sometimes used for automobiles, trucks, vehicles with trailers, planes (when traveling on the ground), heavy equipment such as fork lifts, bulldozers, scrapers and the like, boats, ships, tractor trailers and other types of vehicles. Collision avoidance systems may include one or more sensors that are positioned at various locations on the vehicle, a controller that communicates with the sensors, and a warning device such as an audio, visual and/or haptic device that communicates with the controller. As used herein, the term haptic refers to devices that convey information to the driver through senses other than hearing and sight. For example, the drivers seat may vibrate when an object is present.

For example, the collision avoidance system may include one or more rear sensors that are located on a rear portion of the vehicle. One or more side and/or front sensors that are positioned along sides and/or front of the vehicle may also be used. Sensors that are employed typically include optical sensors such as lasers, ultrasonic sensors, infrared sensors, radio frequency (RF) sensors and the like. These sensors periodically transmit sensing signals that are directed into a sensing zone. Objects that are located in the sensing zone reflect the sensing signals. The timing and/or amplitude of the reflected signals are processed to estimate a distance between the object and the respective sensor.

The sensor output signal indicates a distance between the sensed object and the sensor. For example, when the driver engages reverse, the output of the rear sensor is monitored. If the rear sensor output indicates that the object is less than a preset distance, the collision avoidance system generates a warning signal (audio, visual and/or haptic). Likewise, if the side sensor signal indicates that an object is less than a preset distance, the collision system also generates a warning signal.

Problems arise as the vehicle moves from one location to another. Preset sensor limits that are suitable for one location and/or speed are often not suitable for other locations and/or speeds. For example, if the preset sensor limits are set for loading and unloading a tractor trailer at a warehouse, the same preset limits may not be suitable for highway driving, city driving or other situations.

SUMMARY OF THE INVENTION

A vehicle collision avoidance system according to the present invention includes a warning device and a plurality of sensors that are arranged around the vehicle and that have respective sensing zones. Each of the sensors senses objects that are located in the respective sensing zone and generates sensor signals that are related to a distance between respective ones of the sensors and the objects located in the sensing zones. Memory stores a plurality of profiles, which define at least one alarm limit for each of the sensors. A profile selection device allows selection one of the plurality of profiles. A vehicle collision avoidance controller communicates with the sensors and triggers the warning device when the sensor signal that is associated with one of the plurality of sensors exceeds a respective one of the limits in the selected profile.

In other features, a profile setting module allows at least one of creation, editing and deletion of the profiles. A security module controls access to the profiles based on a security profile. At least one of the plurality of sensors wirelessly communicates with the vehicle collision avoidance controller.

In yet other features, a vehicle positioning system generates vehicle position signals that identify a position of the vehicle relative to a fixed coordinate system. An automatic profile selection module receives the position signals and automatically selects one of the profiles based on the vehicle position signals.

In yet other features, the warning device includes a display that concurrently displays a status for each of the sensors.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 illustrates a profile modification setting dialog box;

FIG. 5 illustrates a profile selection dialog box;

FIG. 6 illustrates a security dialog box;

FIG. 7 Illustrates a security administration table;

DETAILED DESCRIPTION OF THE PREFERRED EMBODIMENTS

Figure 1:
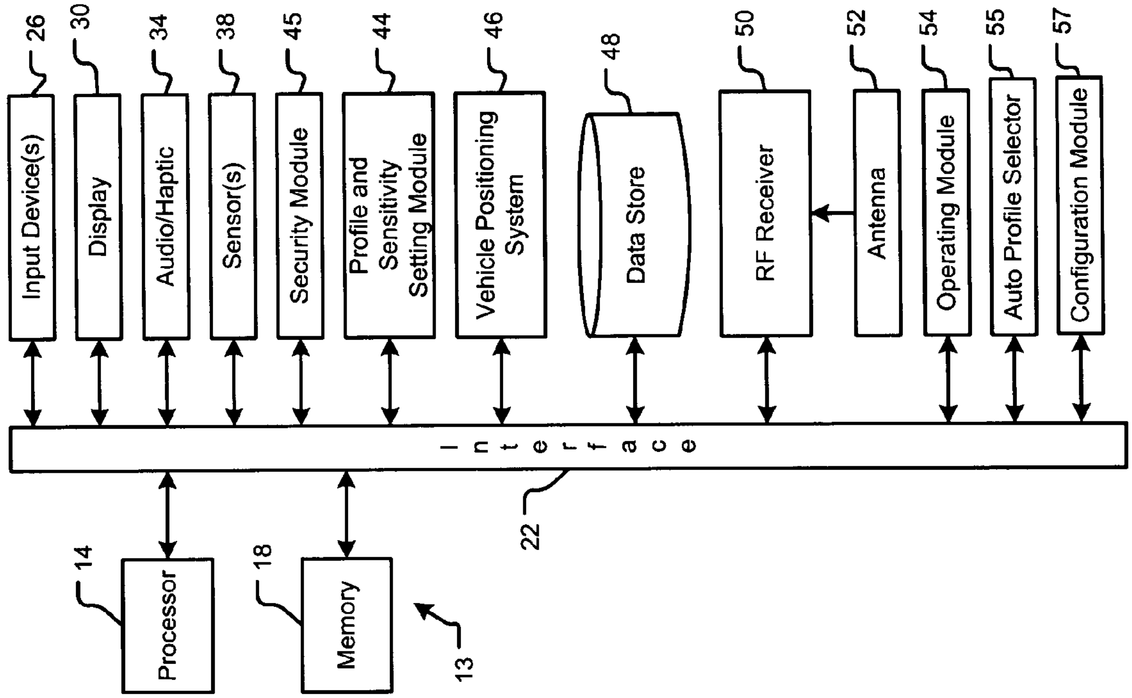
FIG. 1 is a functional block diagram of a vehicle collision avoidance system according to the present invention.

The following description of the preferred embodiment(s) is merely exemplary in nature and is in no way intended to limit the invention, its application, or uses. For purposes of clarity, the same reference numbers will be used in the drawings to identify similar elements.

Referring now to FIG. 1, a vehicle collision avoidance system 10 according to the present invention is shown. The vehicle collision avoidance system 10 includes a controller 13. The controller 13 preferably includes a processor 14 and memory 18 such as read only memory (ROM), random access memory (RAM), flash memory and/or any other suitable electronic data storage. As can be appreciated, the controller 13 may be implemented in a variety of ways including the illustrated processor and memory with software and/or firmware, an Application Specific Integrated Circuit (ASIC), combinational logic, discrete circuits, or in any other suitable manner. The processor 14 and memory 18 of the controller 13 are connected by an input/output (I/O) interface 22 to other devices and/or modules as will be described below.

One or more user input devices 26 communicate with the I/O interface 22. The user input devices 26 may include a keyboard, mouse, selection buttons and/or any other pointing device (such as a stylus with direct input to a display).

A display 30 also communicates with the I/O interface 22 and includes a liquid crystal display (LCD), light emitting diodes (LEDs), a heads up display (HUD), a plasma display, and/or any other suitable type of display. An audio and/or haptic output device 34 preferably includes one or more speakers, headphones, and/or any other device that converts electrical signals to audio signals and/or haptic feedback. The display 30 may be located in a variety of positions in the vehicle. The display 30 may be stand alone, integrated with the instrument panel, with a rear view mirror or a side view mirror, mounted in, on or over a hood of the vehicle, and/or located and/or integrated with any other suitable structure in the vehicle.

One or more sensors 38 communicate either directly and/or wirelessly with the I/O interface 22. The sensors 38 sense a relative proximity of objects that are located in a sensing zone of the associated sensor 38. Typically, the sensing zone will have a generally conical shape that emanates outwardly from the sensor. The sensors 38 can be optical sensors, ultrasonic sensors, infrared sensors, radio frequency (RF) sensors, and/or any other type of suitable sensor that can sense the proximity of objects in the associated sensing zone and generate sensor signal related to a distance of the object.

The sensors 38 are connected to the vehicle in one or more desired sensing locations. As can be appreciated, the location and number of sensors that are used will depend upon the particular application and can be readily modified as conditions dictate. The sensors 38 can be attached to the vehicle using adhesives and/or fasteners such as glue, screws, Velcro® and/or in any other suitable manner. Alternately, the sensors 38 can be attached using one or more magnets to vehicle mounting surfaces. The sensors 38 can be implemented with different sensing profiles. In other words, the angular, height, and/or width sensitivity may vary depending upon the desired function and location of the sensor.

A profile and sensitivity setting module 44 allows users to create and/or edit profiles and limits. The limit(s) that are set for each sensor are stored in a profile. Using the display 30 and the input devices 26, the user creates a new profile or selects one of the existing profiles. The new profile is created by naming the profile and defining sensors and limits. The user may edit the existing limits and/or disable one or more sensors that are associated with a particular profile. A security module 45 may be used to control access to the creation of new profiles and/or to the editing of none, some or all of the existing profiles, as will be described further below.

A vehicle positioning system 46 identifies the relative location of the vehicle and generates vehicle position indicating signals relative to a fixed coordinate system. One exemplary vehicle positioning system 46 is a Global Positioning System (GPS) that includes one or more antennas that triangulate the position of the vehicle using GPS positioning signals generated by satellites. The vehicle positioning system 46 also preferably includes a position translation system that is able to identify the position of the vehicle relative to roads, cities, and/or any other criteria based on the output of the vehicle positioning system. The vehicle positioning system 46 can also be a wheel sensor based system, a cellular based system, or any other system that identifies the location of the vehicle relative to a fixed coordinate system. A data store 48 stores tables, lookup information, profiles, sensor limits, security module tables and/or other structured data and/or tables. An automatic profile selector module 55 selects one of the profiles based on an output of the vehicle positioning system 46.

A configuration module 57 provides plug and play functionality. For example, the sensors 38 may be attached to a trailer that is connected to one or more different tractors of a trucking company. The sensors are disconnected or disassociated (wireless) from the controller 13 and then reattached to or reassociated with another controller associated with a different vehicle (a different tractor in this example). The configuration module 57 automatically senses the number and type of sensors and enables profiles that apply to the sensor configuration. Alternately, the profiles and/or other modules are stored on removable media that is transferred to the new vehicle. Still other variations will be apparent to skilled artisans.

Figure 2:
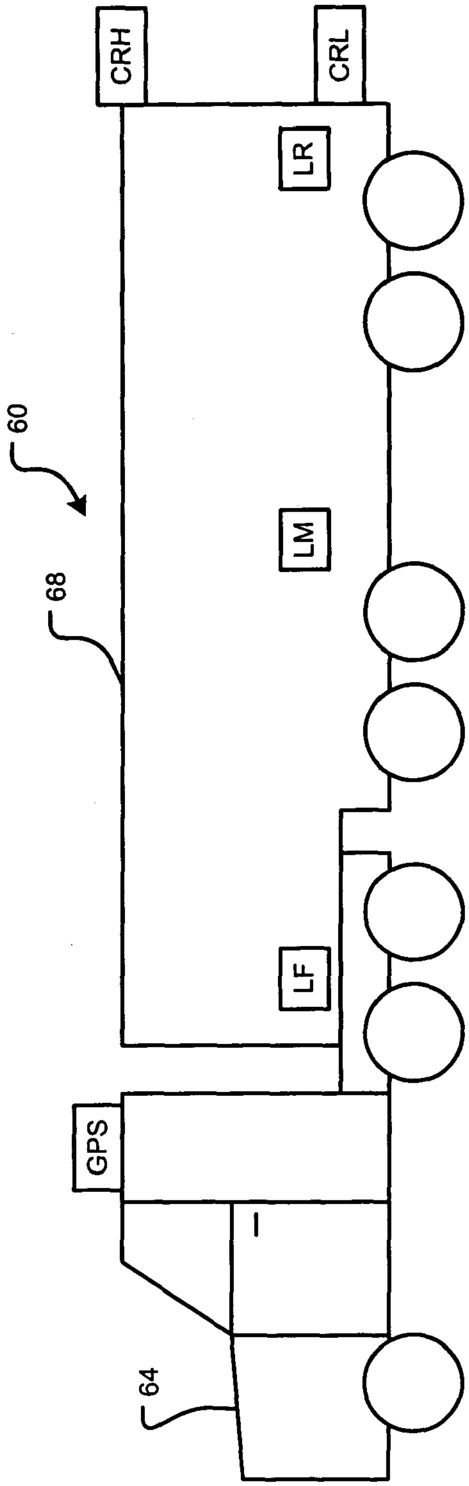
FIG. 2 illustrates the vehicle collision avoidance system of FIG. 1 mounted on an exemplary vehicle.

Referring now to FIG. 2, an exemplary vehicle 60 such as a tractor trailer includes a tractor 64 and a trailer 68. While the tractor trailer is shown, the vehicle collision avoidance system may be used on any type of vehicle. A plurality of sensors 38 are located on the vehicle 60. In this example, the sensors 38 include a left front (LF) sensor, left middle (LM) sensor, left rear (LR) sensor, center rear high (CRH) sensor and center rear low (CRL) sensor, which are mounted on the trailer 68. The CRH sensor senses height obstruction objects such as garage entry doors, bridges and/or other low clearance objects. The CRH sensor may be positioned at 135 degrees relative to top and rear surfaces of the vehicle. Right front (RF), right middle (RM), and right rear (RR) sensors (not shown) are likewise located in similar positions on the passenger side of the trailer 68. The side sensors may be positioned such that the sensing zones overlap slightly.

Figure 3B:
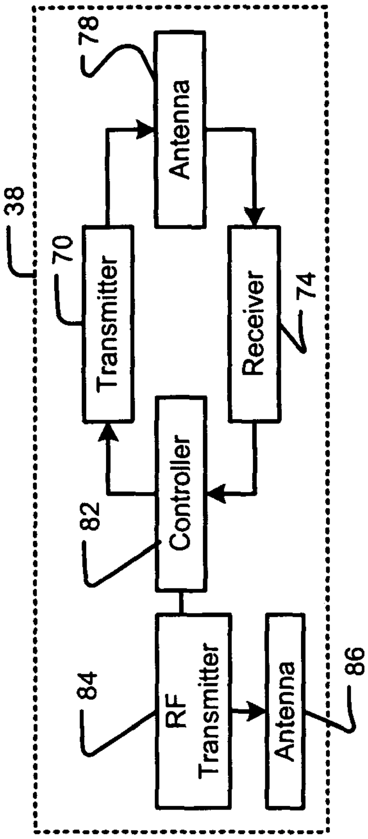
FIGS. 3A and 3B are functional block diagrams of exemplary sensors.
Figure 3A:
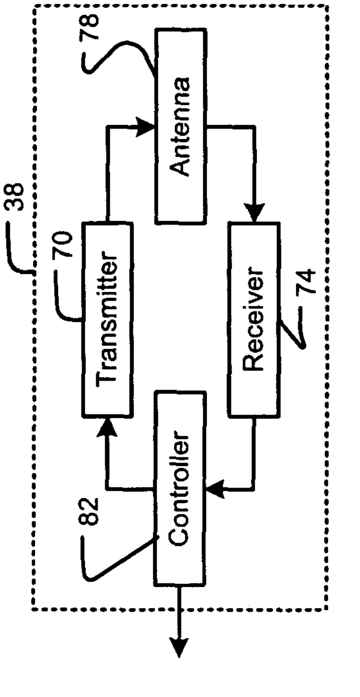

Referring now to FIG. 3A, a functional block diagram of an exemplary sensor 38 is shown to include a transmitter 70 that generates sensing signals. A receiver 74 receives the sensing signals via one or more antennas 78. A sensor controller 82 controls the timing of the transmitted sensing signals and interprets the received signals. The sensor controller 82 generates a sensor output signal that is related to the distance of objects (if present) in the sensing zone. If multiple objects are present, the closes object is monitored. As can be appreciated, the sensor controller 82 may be implemented using discrete circuits, an Application Specific Integrated Circuit (ASIC), a processor and memory running firmware and/or software, combinatorial logic, or in any other suitable manner. In FIG. 3B, a radio frequency (RF) transmitter 84 and antenna 86 are provided to support a wireless connection to the controller 13.

In one exemplary implementation, the controller 13 and the modules are implemented using an object-oriented programs and operating systems executed by general purpose processors and memory. The foregoing description relates to the implementation of the vehicle collision avoidance system in such an environment. Skilled artisans will appreciate that there are other suitable ways of implementing the vehicle collision avoidance system that are well within the scope of this invention.

Referring now to FIG. 4, a profile modification dialog box 100 allows a user to modify an existing profile, to add a new sensor to a profile and/or to delete an existing sensor from a profile. A profile selector 102 allows a user to select an existing profile. Once selected, the dialog box 100 displays the name of existing sensors for the selected profile and limit value input boxes 104-1 and 104-2 (collectively 104) that are associated with each sensor. The input boxes 104 may allow entry of numbers and/or selection from a predetermined list of values. The input boxes 104 also allow one or more of the sensors 38 to be turned off if desired. The input boxes 104 may be associated with red (R), yellow (Y) and/or other alarm zones as shown in FIG. 4.

A remove sensor command button 108 allows a used to remove an existing sensor from the profile using a dialog box or other selection routine. An add sensor command button 110 allows a user to add a sensor to the profile using a dialog box or other selection routine. An OK command button 112 allows the user to select the changes that were made. A Cancel command button 114 allows the user to cancel changes.

Referring now to FIG. 5, a profile selection dialog box 120 allows a user to manually select a user profile using a selector 122 such as a selection list, a drop down list, a check box or any other suitable selection method. Alternately, the user may select an automatic profile selection 124, which will be described further below. A change profile setting command button 128 launches the profile settings dialog box. An add profile dialog command button 129 launches the profile settings dialog box with a blank profile. A user then adds sensors and limits, names the profile, and saves the profile by selecting command button 112.

Referring now to FIG. 6, a security dialog box 130 implements a security protocol that is used to grant or deny a particular user access to any of the functions described herein. The security dialog box 130 may be launched when a user requests access to a particular function. Alternately, the dialog box 130 may form part of the initial launch of the program. In this case, the functions that are granted by the security protocol are enabled and the functions that are not granted are either disabled and/or not shown.

Referring now to FIG. 7, a table 140 (stored in the data store 48) includes usernames with profiles may be used to grant or deny a particular user access to the requested profile. More than one user may have access to the same profile. The security module 45 and the table are used to define user profiles.

Figure 8:
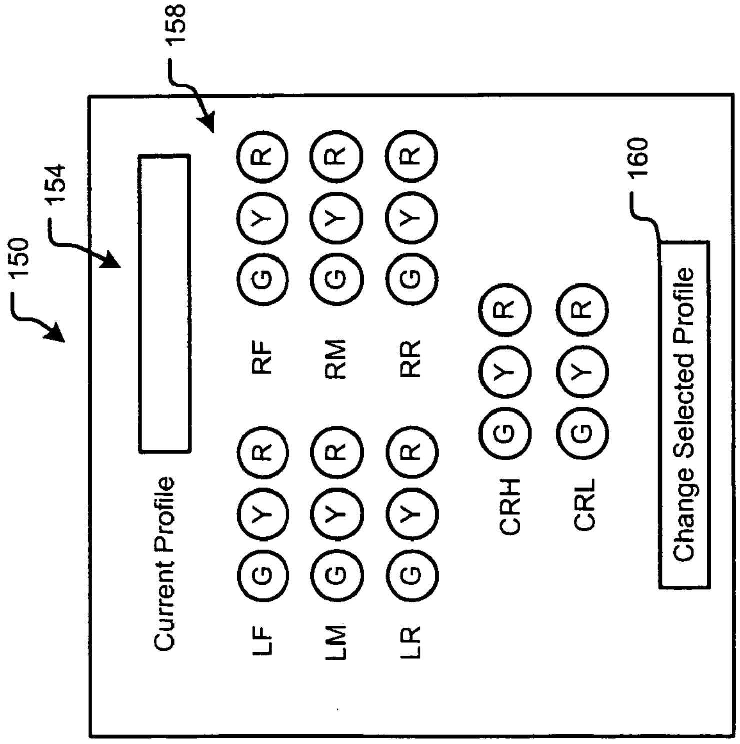
FIG. 8 illustrates a first exemplary display.

Referring now to FIG. 8, a first exemplary display 30-1 is shown. The display 30-1 shows the name of the selected profile and includes a listing of sensors and their current state. When the objects are located outside of the preset limits, the green light remains illuminated. When the objects are within the first preset limit but not the second preset limit, the yellow light is illuminated. When the objects are within the second preset limit, the red light is illuminated. A change selected profile command button 160 launches the profile selection dialog box.

Figure 9:
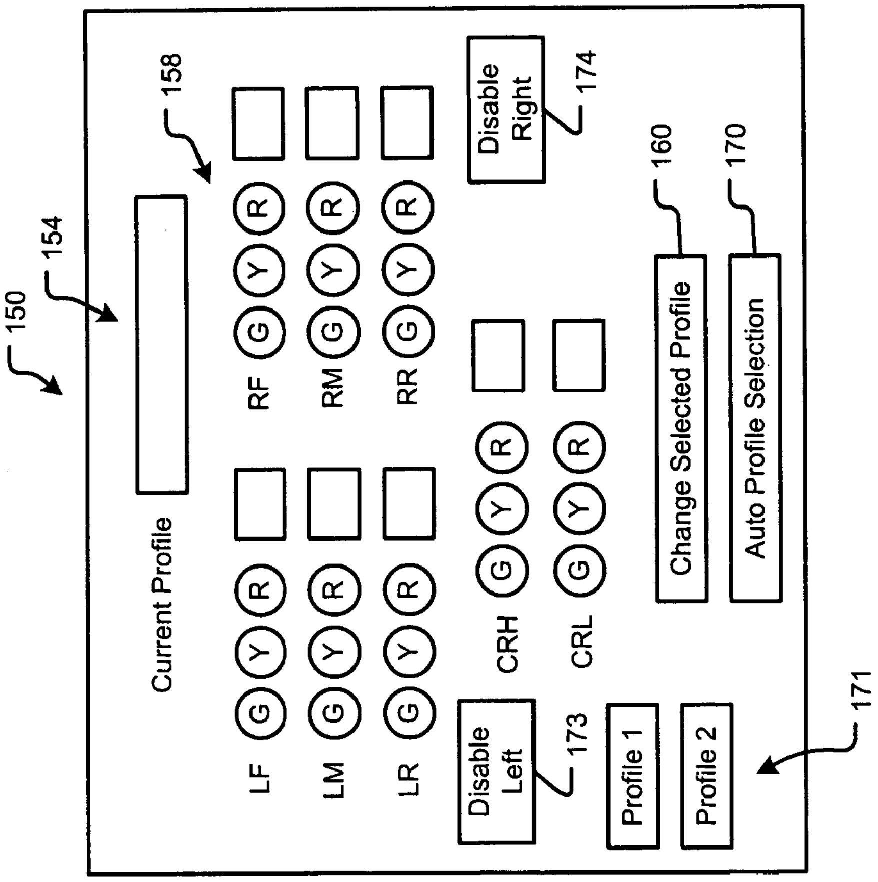
FIG. 9 illustrates a second exemplary display.

Referring now to FIG. 9, a second exemplary display 30 is shown. The display 30-2 shows the name of the current profile and includes a listing of sensors, their current state, and a current sensor reading. When the objects are located outside of the preset limits, the green light is illuminated. When the objects are within the first preset limit but not the second preset limit, the yellow light is illuminated. When the objects are within the second preset limit, the red light is illuminated. The change selected profile command button 160 launches the profile selection dialog box. An auto profile selection command button 170 allows automatic selection of the profile, as described below. When a user selects a profile switch command button 171, the profile is switched on the fly to the selected profile. This feature may be used for profiles that are accessed most frequently to save time. In addition, sensor group disable command buttons may be provided to disable groups of sensors within a profile using a single button. For example, the command buttons 173 and 174 disable left and right sensors, respectively.

The automatic profile selector 170 uses the output of the vehicle positioning system 46 to identify the location of the vehicle. For example, the vehicle positioning system 46 is a GPS system that identifies the location of the vehicle relative to roads. The roads are classified into types, such as rural, suburban, highway, city, and/or other classifications. The profile is automatically selected using the road, the classification and/or other location information. For example, the road type and location can be used to access a lookup table. When the vehicle is located on a rural road and is inside of a first designated warehouse location, a first warehousing profile may be selected. The same type of rural road in another location may be associated with another profile.

As can be appreciated, the controller and/or modules can be provided by a system on chip (SOC), combinatorial logic, an application specific integrated circuit (ASIC), a general purpose processor and memory with software and/or firmware, a computer, or any other type of suitable device. For example, a computer, laptop, or personal digital assistant such as a Palm Pilot® may be used to provide the functionality that is described above. A removable media card with or without a security module may be used to provide the custom programming and/or profiles and limits that are described above.

Figure 10:
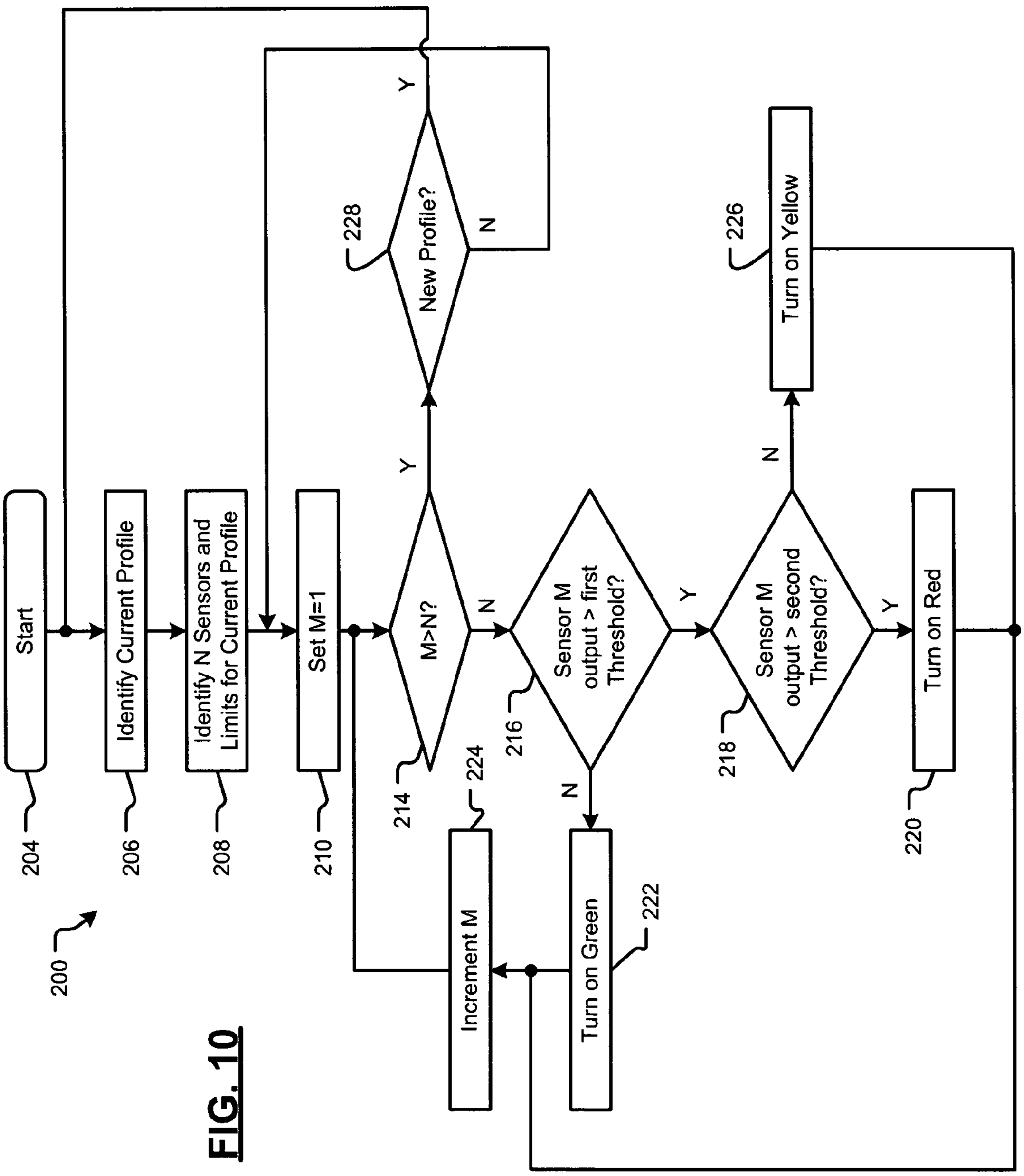
FIG. 10 is a flowchart illustrating steps for operating the vehicle collision object sensor system.

Referring now to FIG. 10, steps for operating the vehicle collision avoidance system are shown generally at 200. In step 204, control begins. In step 206, control identifies a currently selected profile. In step 208, control identifies sensors and limits for the selected profile. In step 210, control sets M=1. In step 214, control determines whether M>N. If not, control determines whether the output of the $M^{th}$ sensor is greater than a first threshold. If true, control determines whether the output of the $M^{th}$ sensor is greater than a second threshold. If true, control turns on the red light associated with the $M^{th}$ sensor.

If step 216 is false, control turns on the green light that is associated with the $M^{th}$ sensor in step 222 and increments M in step 224 (step 220 also continues with step 224). If step 218 is false, control turns on the yellow light that is associated with the $M^{th}$ sensor in step 226 and continues with step 224. If step 214 is true (and all of the sensors have been read and output), control determines whether there is a new profile. If true, control continues with step 206 and retrieves information concerning the new profile. Otherwise, control continues with step 210 and resets M.

The vehicle collision avoidance system according to the present invention allows a user to select sensing profiles based on the road conditions that are at hand. In addition, the vehicle collision avoidance system displays the status of all of the enabled sensors concurrently. Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A collision avoidance system for a vehicle, comprising:

a warning device;

a plurality of sensors that are arranged around the vehicle and that have sensing zones, wherein each of said sensors sense objects that are located in respective ones of said sensing zones and generate sensor signals that are related to a distance between respective ones of said sensors and the objects located in said sensing zones;

memory that stores a plurality of location profiles, each location profile associated with a different operational location of the vehicle, wherein each of said location profiles defines at least one alarm limit for each of said sensors suitable for the current location of the vehicle;

a vehicle collision avoidance controller that communicates with said plurality of sensors and that triggers said warning device when said sensor signal that is associated with one of said plurality of sensors exceeds a respective one of said alarm limits in said selected location profile;

a location profile selection device that allows user selection from among said plurality of location profiles from said memory as the vehicle travels among various locations; and a location profile setting module that allows at least one of creation, editing and deletion of said location profiles as the vehicle travels among various locations.

2. The collision avoidance system of claim 1 further comprising a security module that restricts access to said location profiles based on a security protocol.

3. The collision avoidance system of claim 1 wherein at least one of said plurality of sensors wirelessly communicates with said vehicle collision avoidance controller.

4. The collision avoidance system of claim 1 further comprising:

a vehicle positioning system that generates vehicle position signals identifying a position of said vehicle relative to a fixed coordinate system; and an automatic location profile selection module that receives said position signals and that automatically selects one of said location profiles based on said position signals.

5. The collision avoidance system of claim 1 further comprising a configuration module that automatically configures said collision avoidance system when said sensors are connected to said vehicle collision avoidance controller.

6. The collision avoidance system of claim 1 wherein said warning device includes a display that concurrently displays a status of said sensors.

7. The collision avoidance system of claim 6 wherein said display includes red, green and blue visual states for each of said sensors.

8. The collision avoidance system of claim 1 wherein said sensors are located at least one of a front of said vehicle, on sides of said vehicle, a rear of said vehicle, on side of a device connected to said vehicle, and on a rear of said device connected to said vehicle.

9. A collision avoidance system for a vehicle, comprising:

a warning device;

a plurality of sensors that are arranged around the vehicle and that have sensing zones, wherein each of said sensors sense objects that are located in respective ones of said sensing zones and generate sensor signals that are related to a distance between respective ones of said sensors and the objects in said sensing zones;

memory that stores a plurality of location profiles, each location profile associated with a different operational location of the vehicle, wherein each of said location profiles defines at least one alarm limit for each of said sensors suitable for the current location of the vehicle;

a vehicle positioning system that generates vehicle position signals identifying a position of said vehicle relative to a fixed coordinate system;

an automatic location profile selection module that receives said position signals and that automatically selects one of said location profiles based on said position signals;

a vehicle collision avoidance controller that communicates with said plurality of sensors and that triggers said warning device when said sensor signal that is associated with one of said plurality of sensors exceeds a respective one of said alarm limits in said selected location profile;

a location profile selection device that allows user selection from among said plurality of location profiles from said memory as the vehicle travels among various locations; and a location profile setting module that allows at least one of creation, editing and deletion of said location profiles as the vehicle travels among various locations.

10. The collision avoidance system of claim 9 further comprising a security module that controls access to said location profiles based on a security protocol.

11. The collision avoidance system of claim 9 wherein at least one of said plurality of sensors wirelessly communicates with said vehicle collision avoidance controller.

12. The collision avoidance system of claim 9 wherein said warning device includes a display that concurrently displays a status of said sensors.

13. The collision avoidance system of claim 12 wherein said display includes red, green and blue visual states for each of said sensors.

14. The collision avoidance system of claim 9 wherein said sensors are located at least one of a front of said vehicle, on sides of said vehicle, a rear of said vehicle, on side of a device connected to said vehicle, and on a rear of said device connected to said vehicle.

15. A method for avoiding collisions between a vehicle and objects, comprising:

arranging sensors having sensing zones around the vehicle;

generating sensor signals that are related to a distance between respective ones of said sensors and objects in said sensing zones;

generating and storing a plurality of location profiles, each location profile associated with a different operational location of the vehicle, wherein each of said location profiles defines at least one alarm limit for each of said sensors suitable for the current location of the vehicle;

triggering a warning when said sensor signal that is associated with one of said plurality of sensors exceeds a respective one of said alarm limits in said selected location profile;

selecting from among said plurality of location profiles from said memory as a selected location profile as the vehicle travels among various locations; and allowing at least one of creation, editing and deletion of said location profiles as the vehicle travels among various locations.

16. The method of claim 15 further comprising controlling access to said location profiles using a security protocol.

17. The method of claim 15 further comprising using wireless communications to communicate with said sensors.

18. The method of claim 15 further comprising:

generating vehicle position signals identifying a position of said vehicle relative to a fixed coordinate system; and automatically selecting one of said location profiles based on said vehicle position signals.

19. The method of claim 18 further comprising performing automatic configuration when said sensors are connected.

20. The method of claim 15 further comprising using a plurality of visual states for each of said sensors to identify a position of said object relative to said vehicle.

* * * * *